United States Patent Office 3,562,227
Patented Feb. 9, 1971

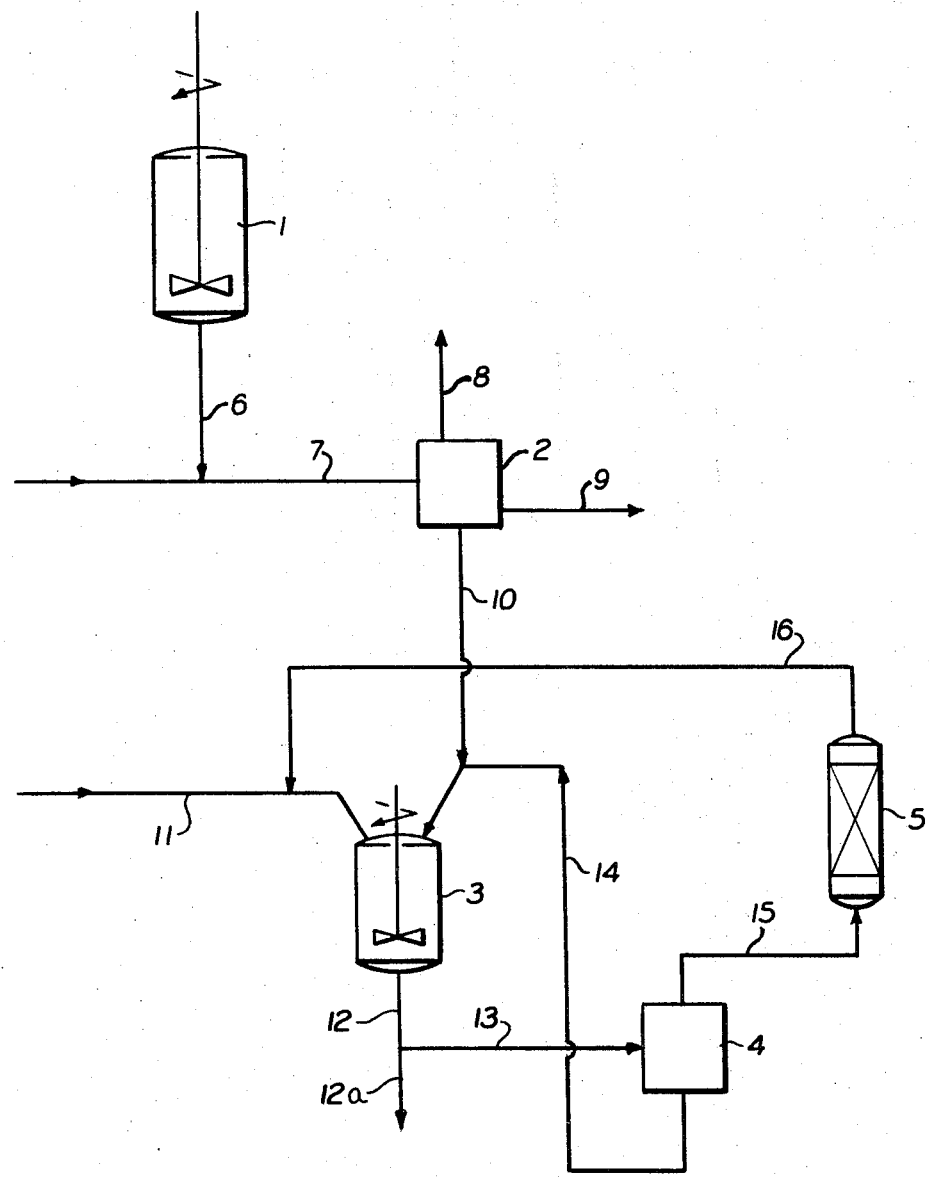

3,562,227
PROCESS FOR SEPARATING POLYMERIZATION SOLVENT MEDIA FROM ELASTOMERIC POLYMER
Giovanni di Drusco, Bologna, and Paolo Galli, Ferrara, Italy, assignors to Montecatini Edison S.p.A., Milan, Italy
Filed Dec. 23, 1966, Ser. No. 604,345
Claims priority, application Italy, Dec. 30, 1965, 29,170/65
Int. Cl. C08f 15/40
U.S. Cl. 260—80.78
1 Claim

ABSTRACT OF THE DISCLOSURE

Process for separating and recovering liquid polymerization medium from elastomeric polymers produced therein comprising, in sequence, (a) first contacting the polymer solution or suspension with a liquid which is a nonsolvent for the polymer to effect initial phase separation between the polymer and the polymerization medium; (b) second, extracting residual medium from the polymer by contacting it with a liquid which is a nonsolvent for the polymer but a solvent for the medium; (c) third, separating the polymer from the liquid phase, as by centrifuging, and recycling said polymer to the second step (b) until the desired residual content of medium in the polymer is obtained; and (d) passing the liquid phase from step (c) through an adsorption column to separate the medium from the extracting liquid by selective adsorption and recycling the thus regenerated extraction liquid for further use in said extraction step (b).

BACKGROUND OF THE INVENTION (1) Field of the invention

The present invention is concerned with a method of treating elastomeric polymers obtained by liquid phase polymerization, i.e., by polymerization in the presence of liquids which are capable of dissolving the polymerization products or in which said products are suspended. More particularly, the present invention is concerned with a process for eliminating and recovering the mediums from elastomeric polymers obtained by liquid phase polymerization. Whenever used in the present application, the term, "mediums," is intended to refer to the liquid compounds used as the polymerization medium, whether they actually dissolve the polymerization products or merely have such products suspended therein. Similarly, the term, "systems," refers to the liquid phases containing the polymer, either when they are true solutions or when they are suspensions.

(2) Description of the prior art

Many kinds of elastomeric polymers are known in the art, for example, butadiene-styrene copolymers, isobutene-isoprene copolymers, polyisoprene, polybutadiene, amorphous copolymers of ethylene with higher alpha-olefins, amorphous terpolymers of ethylene, higher alpha-olefins and one or more linear or cyclic hydrocarbon dienes or polyenes, etc. These polymers are generally obtained by polymerization in a liquid phase consisting of aliphatic, cycloaliphatic or aromatic hydrocarbons, either halogenated or not. Particularly in the case of copolymers of ethylene and alpha-olefins, either alone or in mixture with hydrocarbon dienes or polyenes, the liquid polymerization phase may consist of one or more of the comonomers employed in the polymerization, kept in the liquid state.

In processes for preparing these polymers, therefore, the problems are presented of the recovery of the polymers in an easily transferable and handy form, as well as of separation and recovery of the mediums used in the polymerization. Several solutions to the problem of the recovery of the medium from the elastomer solutions or suspensions have been proposed in the prior art. These include, for example:

(1) Distillation in vapor stream;
(2) Evaporation, optionally under vacuum;
(3) Extraction by means of a selective solvent which is not capable of dissolving the polymer; and
(4) Azeotropic distillation.

In many cases, these operations are preceded by a precipitation or coagulation of the elastomer from the system by adding a suitable nonsolvent, usually of polar type (water, alcohols, etc.). However, in these cases too, even if a portion of the solvent may be eliminated (if it is miscible with the nonsolvent added) by separating the solid phase from the liquid, appreciable amounts of the original medium, and possibly of the added nonsolvent, still impregnate the solid elastomer. It is, therefore, necessary to remove them by means of one of the above mentioned methods. Said methods of removing the medium, either when they involve solutions or when they are concerned with the wet polymers which are precipitated therefrom, possess, however, considerable drawbacks, especially from the economic point of view, because of the large amounts of power and/or auxiliary liquids (nonsolvents for the elastomer) which must be consumed. Thus, in all the processes which involve a transition from the liquid into the vapor phase, it is necessary to supply large amounts of evaporation heat, while in the case of selective extraction large amounts of liquid are usually necessary. Further, the elimination of the last traces of the medium requires, as is known, very large amounts of heat or of extracting liquid.

For example, in the removal of the medium from the polymer by means of distillation in a vapor stream, the steam consumption is relatively small in order to reach a residual content of medium in the polymer of about 5% by weight, while in order to further reduce the content in the final elastomer below about 0.5–0.2%, as is usually required, the steam consumption is many times greater. This is due both to the unfavorable situation of the thermodynamic water-polymer-medium equilibrium, and to the establishment of a dynamic equilibrium connected with often unfavorable kinetic factors, such as solubility of the medium in water, diffusion of the medium within the polymer particle and diffusion at the interface between polymer particle and water. Therefore, in this method of extracting the medium by distillation in a vapor stream, the steam consumption is many times greater than that calculated for the theoretical equilibrium.

SUMMARY OF THE INVENTION

We have now found that it is possible to reduce the content of polymerization medium in the final elastomer to values below 0.5%, down to values of about 0.1%, without consuming great amounts of power or extracting liquids. This result is achieved, in accordance with the present invention, by a process for separating elastomeric polymers obtained by polymerization in liquid phase from the polymerization mediums in which they are contained in solution or suspension, which process comprises the following steps:

(a) A first step in which the polymer solution or suspension, discharged from the polymerization reactor, is contacted with a liquid which is a nonsolvent for the polymer, at such a temperature as to eliminate most of the unreacted volatile monomers present and part of the polymerization medium, (b) A second step in which the polymer suspension in the nonsolvent liquid thus obtained, optionally after an intermediate concentration step, is contacted with a liquid which is capable of extracting the original polymerization medium but which is a nonsolvent for the polymer, at such a temperature as to dissolve, at least partially, said medium, (c) A third step in which the solid phase, consisting of the polymer, is separated from at least part of the liquid phase containing the medium in solution, the solid phase being again subjected to extraction (step b) until the content of residual medium in the polymer has reached the desired value, (d) A fourth step in which said liquid phase containing the medium in solution is passed through a bed of a substance which is capable of selectively adsorbing the polymerization medium from the extracting liquid, and the extraction liquid, substantially free from said medium, is continuously recycled for use in the second extraction step.

In comparison with the processes of the prior art, the above described cycle shows the following conspicuous advantages:

(1) All the operations are carried out at the same temperature, without any liquid-vapor phase transition in the cycle and, therefore, without the need of introducing any energy into the system. The formation of vapors will take place only in the first step, namely in the stripping stage.

(2) The amounts of extracting liquid used in the cycle are remarkably reduced in comparison with the other types of process.

(3) The operations of separation and recovery of the elastomer, and of the original medium, may be carried out by conventional means, under conditions which are very simple in comparison with those occurring when the same methods are directly applied to the starting solution of the elastomer. Also, the suitable selection of the nonsolvent with relation to its volatility may considerably simplify the separation both of the elastomer (which is not swollen) and of the adsorbing medium.

BRIEF DESCRIPTION OF THE DRAWING

The present invention will be more fully understood from the following description taken in connection with the accompanying illustrative drawing.

The drawing is a schematic diagram of a polymer extraction and medium recovery system embodying a preferred form of the present invention.

Referring to the drawing in detail, the illustrated system comprises a polymerization reactor 1, a first solid-liquid phase separator 2, an extractor 3, a second solid-liquid phase separator 4, and an adsorption column 5. The polymerization system is discharged from the bottom of reactor 1 through a conduit 6 and is conducted to a conduit 7 wherein it is stripped with a stream of water or of another liquid which is a non-solvent for the polymer. Suitable examples of extracting liquid include lower aliphatic alcohols having preferably not more than 4 carbon atoms (methanol, ethanol, etc.), lower aliphatic ketones having preferably not more than 4 carbon atoms (acetone, methylethyl-ketone, etc.), aliphatic hydrocarbons having from about 3 to 10 carbon atoms and preferably not more than 4 carbon atoms (propylene, etc.) in the liquid state, as well as water.

If polyfuncitonal compounds having more hydroxyl or carbonyl groups are used, these compounds may also contain more than 4 carbon atoms. In any case however extracting liquids containing not more than 4 carbon atoms are preferred. Conduit 7 discharges into phase separator 2 wherefrom vapors are drawn off overhead through a conduit 8 and, possibly, a portion of the liquid employed in the stripping is separated and removed through a conduit 9. The resulting elastomer suspension is discharged into extractor 3, provided with a stirrer, via conduits 10 and 14 where it is contacted with the extracting liquid which is introduced through conduit 11. The stripping is carried out at such a temperature as to allow the elimination of the volatile monomers possibly present and of part of the polymerization medium. Temperatures between 10 and 130° C. are generally employed.

The new suspension coming from the bottom of the extractor 3 is conducted to the second liquid-solid phase separator 4 via conduits 12 and 13. The wet polymer is recycled from separator 4 to extractor 3 via conduit 14, while the liquid phase is conducted via conduit 15 to column 5 wherein it is passed through a bed of a substance which selectively adsorbs the original medium (preferably, active coals such as those known under the trademarks Norit, Pittsburg, CECA and the like, active alumina, silica gel or molecular sieves are used) to separate it from the extracting liquid. The extracting liquid is recovered from column 5 in practically pure form and is recycled to the extractor 3 via conduits 16 and 11. The original medium is recovered periodically from the adsorption bed and can then be reused in the reactor 1. In particular, the adsorbing substance may be periodically regenerated by conventional methods, such as for instance: treatment with steam or flushing inert gases at relatively high temperatures, followed by the separation and recovery of the original medium from the elastomer.

The extracting liquid should be a solvent, even if moderate, for the polymerization medium which impregnates the polymer, but a nonsolvent or a nonswelling agent for the polymer. The selection of the extracting liquid, therefore, depends upon the nature of the polymer and the kind of medium to be eliminated. Suitable examples of extracting liquid include lower aliphatic alcohols having preferably not more than 4 carbon atoms (methanol, ethanol, etc.), lower aliphatic ketones having preferably not more than 4 carbon atoms (acetone, methylethylketone, etc.), aliphatic hydrocarbons having from about 3 to 10 carbon atoms and preferably not more than 4 carbon atoms (propylene, etc.) in the liquid state, as well as water. If polyfunctional compounds having more oxydrilic or carbonyl groups are used, these compounds may also contain more than 4 carbon atoms. In any case, however, extracting liquids containing not more than 4 carbon atoms are preferred. One or more of the liquid monomers which leave the reactor together with the polymer may be used as hydrocarbons, either alone or in mixture with another nonsolvent (e.g., mixtures of propylene and methanol or mixtures of propylene, ethylene and methanol, etc.).

The extraction may be carried out in a common vessel, suitably kept under stirring and possibly provided with means for heating to the selected temperature and with an outlet for the suspension through a suitable valve at the bottom thereof.

Although in the drawing and in the examples a single extraction stage is mentioned, it is to be understood that multistage apparatus of any suitable known type may be used, preferably in countercurrent arrangement. The solid-liquid separation (stage 4) may consist, for example, of a mangle, a sieve, a centrifuge, a hydrocyclone, or the like. In any event, a complete separation between solid and liquid is not required.

Also, the selection of the adsorbing substance to be employed in column 5 is governed by the nature of the medium and of the extracting liquid. I should in any event have great adsorbing power with respect to the medium while the extracting liquid must not be adsorbed or must be adsorbed only to a minor extent. Various materials such as activated charcoal, silica gel, active alumina, etc. may as said above, for instance, be used.

When the polymer has reached a content of residual medium lower than the predetermined amount, it is discharged from the extractor 3 through conduits 12 and 12a, whereupon the extracting medium is removed from the polymer and the polymer is dried by known methods.

The closed-cycle process described herein is carried out under constant temperature conditions and without any introduction of thermal power, so that it can be considered as perfectly adiabatic.

The working temperature must be selected in accordance with the relative solubility of the polymer and of the medium in the extracting liquid, as well as with the most appropriate conditions for the adsorption, and is generally in the range of from about 1 to 130° C., depending on the particular type of extracting liquid employed.

DESCRIPTION OF THE PREFERRED EMBODIMENTS

The following examples are presented to further illustrate the separation method of the present invention but are not intended to limit the scope thereof.

Example 1

A portion of an aqueous suspension of an ethylene/propylene/5-methyltetrahydroindene terpolymer having a Mooney viscosity ML (1+4) 100° C. of 95 and an average particle size of 1–1.5 mm., said portion containing 2086 g. of polymer and a residual content of benzene (polymerization solvent) of 20.4%, obtained by stripping the mixture from a polymerization reactor with hot water (at about 80° C.) and by subsequent separation of the solid phase from the liquid phase, was conveyed to a 10-liter extractor filled with water, provided with stirrer, and kept at a constant temperature of 65° C. by means of a steam jacket. The polymer concentration in the extractor was of 83 g./l. Water was continuously withdrawn from the bottom of the extractor through a filtering net and was conveyed to an adsorption column, kept at the same temperature of the extractor, having a diameter of 12 cm. and a height of 50 cm., and containing 1.06 kg. of granular Sorbonorit III activated charcoal (commercial product of Norit Co.—apparent density=0.240 to 0.512 g./cm.$^3$; surface area=500 to 1600 m.$^2$/g.) in the form of small cylinders having a diameter of 3 mm. and a height of 4–7 mm. From the top of the column, the water, thus freed from most of the benzene, was recycled to the extractor, while keeping in the cycle an average flow rate of water of about 250 liters/hour. After 11 hours of extraction, the polymer was discharged from the extractor and the content of residual benzene was determined and found to be less than 0.5%.

The benzene adsorbed in the column of activated charcoal was almost quantitatively recovered by stripping with steam at a temperature of about 180° C.

Example 2

In the same extractor and under the same operating conditions as described in Example 1, an extraction run was carried out employing a portion of an aqueous suspension of an ethylene/propylene copolymer (C$_3$% by weight=62) having a Mooney viscosity ML (1+4) 100° C. of 35, containing 2185 g. of polymer with a residual benzene (polymerization solvent) content of 18.5%, thus obtaining in the extractor a polymer concentration of 89 g./l. The water coming from the extractor bottom was conveyed to the bottom of an adsorption column having a height of 50 cm. and a diameter of 12 cm., filled with 1.3 kg. of Sorbonorit III activated charcoal. The water, freed from most of the benzene, was then recycled to the extraction vessel with an average flow rate in the cycle of 550 liters/hour. The cycle was continued for 10 hours, at the end of which it was determined that the discharged polymer had a residual benzene content lower than 0.5%.

In the same apparatus and under the same operating conditions a second run was then carried out starting with a portion of suspension of the same copolymer, comprising 1740 g. of polymer with a residual benzene content of 31%. The water coming from the extractor was passed through the adsorption column used for the preceding extraction, without any previous regeneration of the activated charcoal, and then recycled from the top of the column to the extraction stage. The cycle was continued for 8 hours with a water flow rate of 750 liters/hour. The polymer was then discharged and was found to have a residual benzene content lower than 0.6%.

Example 3

In the same apparatus and under the same conditions as in Example 1, an extraction run was carried out using a portion of an aqueous suspension of polybutadiene having a Mooney viscosity ML (1+4) 100° C. of 33.5, formed by 2053 g. of polymer with a residual benzene content (polymerization solvent) of 27.5%. The water coming from the extractor was conveyed to the usual adsorption column filled with 1.1 kg. of Sorbonorit III activated charcoal, from which it was then recycled, free from most of the benzene, to the extractor, while keeping in the cycle a total flow rate of 600 liters/hour. The cycle was continued for 5 hours, at the end of which a residual benzene content of 0.5% was found in the polymer.

Example 4

A portion of an aqueous suspension of an ethylene/propylene/5-methyltetrahydroindene terpolymer having a Mooney viscosity ML (1+4) 100° C. of 95, containing 1186 g. of polymer having an average particle size of 1–1.5 mm., with a content of free 5-methyltetrahydroindene of 15.2%, was introduced into a glass column having a height of 40 cm. and a diameter of 8 cm. The copolymer was obtained by polymerization in the presence of a liquid phase consisting of a mixture of propylene and 5-methyltetrahydroindene, kept in the liquid state. During the polymerization the polymer was suspended in the liquid phase. The suspension, after having been removed from the reactor, was subjected to stripping in the previously described manner and, after separation of the solid phase from the liquid phase, was introduced into the extractor. In order to avoid packing of the elastomer, layers of polymer suspension were alternated in the column with glass Raschig rings. The extracting liquid, consisting of water, was passed through the column and circulated from this column into an adsorption column containing 1.08 kg. of Sorbonorit III activated charcoal with a flow rate of 180 liters/hour, while the temperature was kept at 96° C. After 24 hours the cycle was stopped and the 5-methyltetrahydroindene content found in the recovered polymer was 0.5%.

Example 5

In the same laboratory apparatus, and following the same procedure as in Example 4, an extraction run was carried out on a portion of an aqueous suspension of an ethylene/propylene/5-methyltetrahydroindene terpolymer containing 1123 g. of polymer with a content of free 5-methyltetrahydroindene of 11%, obtained by polymerization in suspension. Layers of elastomeric suspension were alternated in the column with layers of glass Rasching rings, in order to avoid packing, and methanol was employed as the extraction liquid. Methanol coming from the bottom of the extraction column was passed through an adsorption column filled with 1.1 kg. of Sorbonorit III activated charcoal and then recycled to the extraction column, while maintaining a flow rate of 4.4 liters/hour and a temperature of 55° C. After 4 hours, the 5-methyltetrahydroindene monomer content in the methanol was 0.11% while the residual monomer content in the polymer wos 0.24%.

A second extraction run was carried out on the same terpolymer, using the apparatus described in Example 1, by introducing into a 20-liter extractor a charge containing 3885 g. of terpolymer separated from the aqueous suspension by means of a mangle, and using methanol as the extracting liquid. The methanol coming from the extractor bottom was passed through the adsorption column filled with 2.5 kg. of Sorbonorit III activated charcoal and then recycled, free from most of the 5-methyltetrahydroindene, to the extraction stage, while maintaining a flow rate of methanol of 650 liters/hour and a temperature of 60° C. The decrease of the 5-methyltetrahydroindene content of the polymer was periodically determined by analyzing samples of methanol leaving the extractor. The cycle was stopped after 5 hours, at the end of which time a free 5-methyltetrahydroindene content of 0.5% was found in the elastomer.

Variations can, of course, be made without departing from the spirit and scope of this invention.

Having thus described our invention, what is desired to be secured and claimed by Letters Patent is:

1. A process for separating an elastomeric polymer selected from the group consisting of butadiene-styrene copolymers, isobutene-isoprene copolymers, polyisoprene, polybutadiene, amorphous copolymers of ethylene with higher alpha-olefins, and amorphous terpolymers of ethylene, higher alpha-olefins and one or more linear or cyclic hydrocarbon dienes or polyenes obtained by liquid phase polymerization from the polymerization medium in which it is contained in suspension or in solution, which process comprises:
  (a) stripping the polymer solution or suspension with a liquid selected from the group consisting of water, alcohols and ketones, which liquid is a nonsolvent for the polymer, at such a temperature between about 10° to 130° C. as to remove at least most of the volatile monomers present in said solution or suspension and a portion of the polymerization medium, and forming a suspension of said polymer in said nonsolvent liquid;
  (b) contacting under agitation said polymer suspended in the nonsolvent liquid with an extracting liquid which is an extractant for the original polymerization medium, but which is a nonsolvent for the polymer, said extracting liquid being selected from water, lower aliphatic alcohols, lower aliphatic ketones and hydrocarbons having from 3 to 10 carbon atoms;
  (c) separating the solid polymer from at least part of the extracting liquid, which liquid contains said medium dissolved therein, and subjecting said separated solid polymer to said step (b) using substantially medium-free extracting liquid;
  (d) continuing said step (c) until the residual content of said medium in said polymer is less than about 0.5%;
  (e) passing said extracting liquid containing said medium through a bed of an adsorbent which is capable of selectively adsorbing the polymerization medium from the extracting liquid; and
  (f) recycling said extracting liquid substantially free of said medium, obtained from the selective adsorption step (e), to said extraction step (b).

References Cited

UNITED STATES PATENTS

| | | | |
|---|---|---|---|
| 2,957,861 | 10/1960 | Goins | 260—94.9 |
| 3,373,145 | 3/1968 | Wagner | 260—78 |
| 3,074,921 | 1/1963 | Carter | 260—94.9 |
| 3,335,120 | 8/1967 | Hagemeyer | 260—93.7 |

JOSEPH L. SCHOFER, Primary Examiner

R. S. BENJAMIN, Assistant Examiner

U.S. Cl. X.R.

260—84.1, 85.1, 85.3, 88.2, 94.3, 94.7

PO-1050
(5/69)

UNITED STATES PATENT OFFICE
CERTIFICATE OF CORRECTION

Patent No. 3,562,227   Dated February 9, 1971

Inventor(s) Giovanni di Drusco and Paolo Galli

It is certified that error appears in the above-identified patent and that said Letters Patent are hereby corrected as shown below:

Column 3, line 64, "polyfuncitonal" should read -- polyfunctional --. Column 4, line 65, "I" should read -- It --. Column 5, line 9, "1 to 130°C.," should read -- 10 to 130°C, --. Column 6, line 57, "Rasching" should read -- Raschig --. Column 7, line 28, "10° to 130°" should read -- 10° and 130° --; line 31, "forming" should read -- form --.

Signed and sealed this 26th day of October 1971.

(SEAL)
Attest:

EDWARD M. FLETCHER, JR.
Attesting Officer

ROBERT GOTTSCHALK
Acting Commissioner of Patent